United States Patent
Wobben

(10) Patent No.: US 7,699,273 B2
(45) Date of Patent: Apr. 20, 2010

(54) HOLDING DEVICE FOR ACCOMMODATING A MOBILE TERMINAL/SCREEN

(76) Inventor: Aloys Wobben, Argestrasse 19, Aurich (DE) 26607

( * ) Notice: Subject to any disclaimer, the term of this patent is extended or adjusted under 35 U.S.C. 154(b) by 42 days.

(21) Appl. No.: 11/578,659

(22) PCT Filed: Apr. 15, 2005

(86) PCT No.: PCT/EP2005/051668

§ 371 (c)(1), (2), (4) Date: Aug. 15, 2007

(87) PCT Pub. No.: WO2005/100094

PCT Pub. Date: Oct. 27, 2005

(65) Prior Publication Data

US 2007/0296183 A1    Dec. 27, 2007

(30) Foreign Application Priority Data

Apr. 16, 2004   (DE) .................. 10 2004 019 188

(51) Int. Cl.
G12B 9/00 (2006.01)
(52) U.S. Cl. .................................................. 248/27.1
(58) Field of Classification Search ................ 248/27.1, 248/27.3; 361/686
See application file for complete search history.

(56) References Cited

U.S. PATENT DOCUMENTS

| | | | | |
|---|---|---|---|---|
| 2,157,001 A | * | 5/1939 | Morley | 248/205.6 |
| 2,721,663 A | * | 10/1955 | Maldon | 211/126.11 |
| D259,243 S | * | 5/1981 | Argante | D8/375 |
| 4,892,281 A | * | 1/1990 | DiFilippo et al. | 248/311.2 |
| 5,199,772 A | * | 4/1993 | Jordan | 312/7.1 |
| 5,387,010 A | * | 2/1995 | Mohr | 281/43 |
| 5,489,055 A | * | 2/1996 | Levy | 224/544 |
| 6,158,699 A | * | 12/2000 | Boe | 248/27.1 |
| 6,364,260 B1 | * | 4/2002 | Lorincz et al. | 248/215 |
| 6,381,133 B1 | * | 4/2002 | Chen | 361/686 |
| 2001/0042812 A1 | | 11/2001 | Perzewski | |
| 2003/0089832 A1 | | 5/2003 | Gold | |

FOREIGN PATENT DOCUMENTS

| | | |
|---|---|---|
| CA | 2006919 | 12/1990 |
| DE | 92 13 585.4 U1 | 1/1993 |
| JP | 2001122043 A | 5/2001 |
| JP | 2003504261 A | 2/2003 |
| JP | 2003160001 A | 6/2003 |
| WO | 98/17501 A1 | 4/1998 |

* cited by examiner

Primary Examiner—Ramon O Ramirez
(74) Attorney, Agent, or Firm—Seed IP Law Group PLLC

(57) ABSTRACT

There is provided a removable holding device for accommodating a mobile terminal and/or a screen in the passenger region of a vehicle. The holding device comprises at least one bar with a first end for insertion into fitments of a vehicle and a second end for accommodating the mobile terminal and/or the screen. That holding device has proven to be advantageous insofar as it is easy to remove/insert.

11 Claims, 19 Drawing Sheets

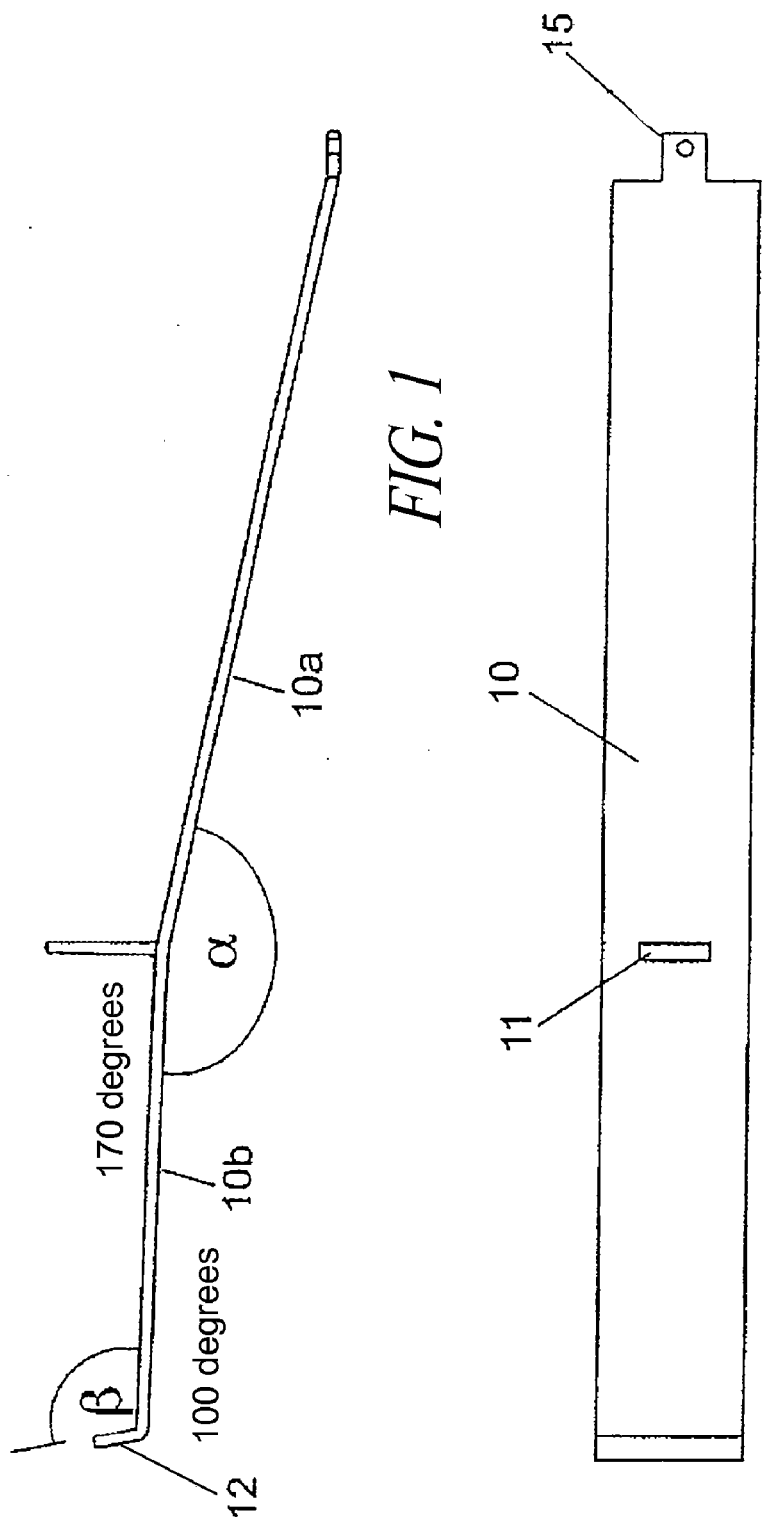

HOLDING DEVICE FOR ACCOMMODATING A MOBILE TERMINAL/SCREEN

BACKGROUND OF THE INVENTION

1. Field of the Invention

The invention relates to holding portable computers in place and more particularly to a holding device for a portable computer that can be placed on the dashboard of an automobile.

2. Description of the Related Art

Presently, the maintenance of buildings, structures, and other power installations, such as for example wind power installations, usually requires mobile computer equipment, in particular data processing apparatuses such as for example notebooks, laptops, palmtops or the like. The problem which arises is that of providing for adequately holding stands and stable platforms for mobile computer units. As maintenance and upkeep operations have to be carried out not just when the weather is good, it is desirable for the mobile units which are required for work or building maintenance to be mounted within a vehicle for the duration of the maintenance procedure.

BRIEF SUMMARY OF THE INVENTION

Therefore, one object of the present invention is to provide a holding device for mobile computer units, which makes it possible for mobile computer units to be mounted in a simple fashion in the interior of a vehicle, such as a motor vehicle.

That object is attained by a holding device as set forth in the claims appended hereto.

There is provided a removable holding device for accommodating a mobile unit, in particular a data processing apparatus, and/or a screen, in the passenger region of a vehicle. The holding device has at least one holder having a first portion for fixing or for insertion in/on fitments of a vehicle and a second portion for accommodating the mobile unit and/or the screen. That holding device is found to be advantageous insofar as it is easy to remove/insert.

In accordance with an embodiment of the present invention the first portion of the at least one holder is suited to being inserted or engaged into existing openings in the fitments at the passenger side in the passenger-side region of the console of a vehicle.

In accordance with a preferred configuration of the invention the holder has a first side and a second side, wherein provided on the second portion of the holder is an edge which is inclined towards the first side. In that way a mobile unit can be laid on the first side of the at least one holder, in which case the unit is prevented by the edge from slipping off the holder.

In accordance with a further configuration of the invention an angle of less than 180° is included between the second sides of the first and second portions of the at least one holder. In that way a mobile unit can be operated in an ergonomically advantageous position.

Further configurations of the invention are subject-matter of the appendant claims.

BRIEF DESCRIPTION OF THE SEVERAL VIEWS OF THE DRAWING(S)

The invention is described in detail hereinafter with reference to the drawing.

FIG. 1 shows a side view of a holder in accordance with a first embodiment,

FIG. 2 shows a plan view of the holder of FIG. 1,

Figure 3:
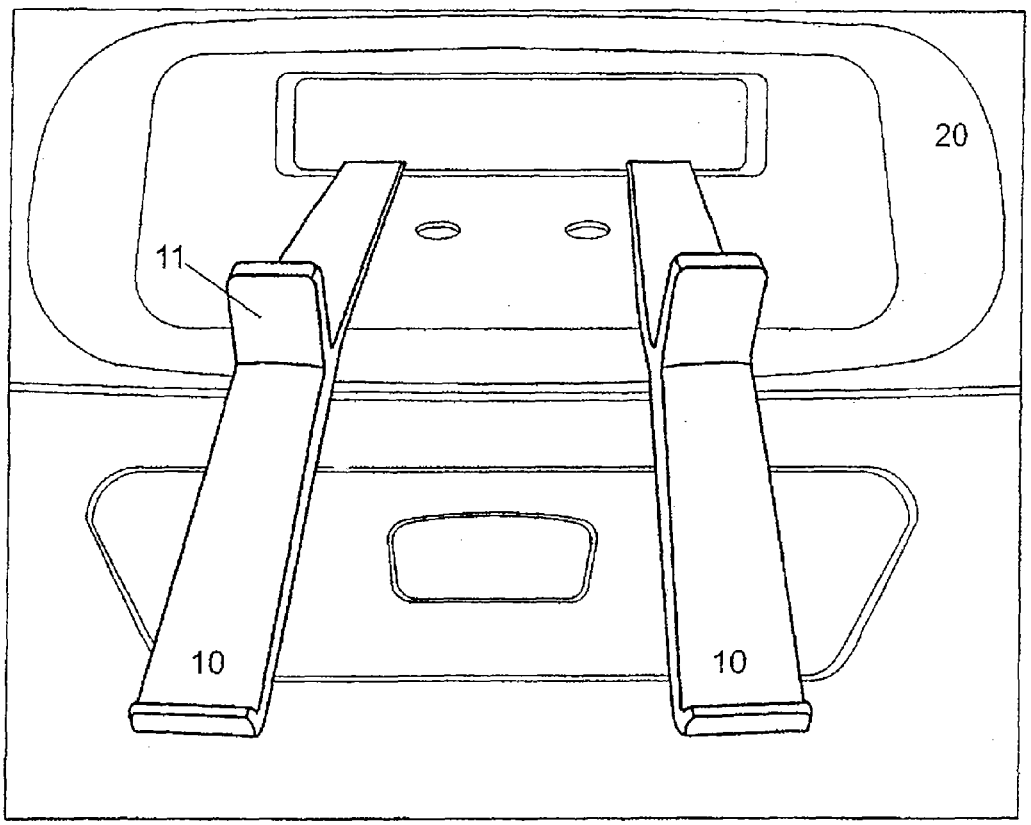
Figure 4:
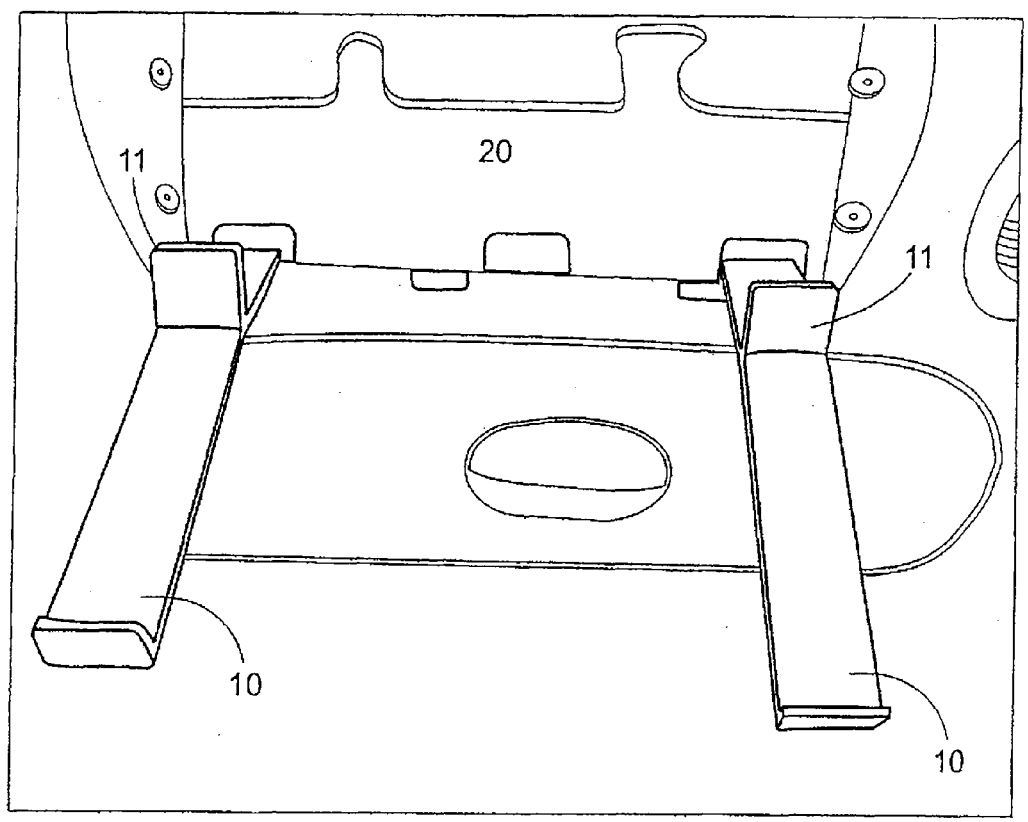
Figure 5:
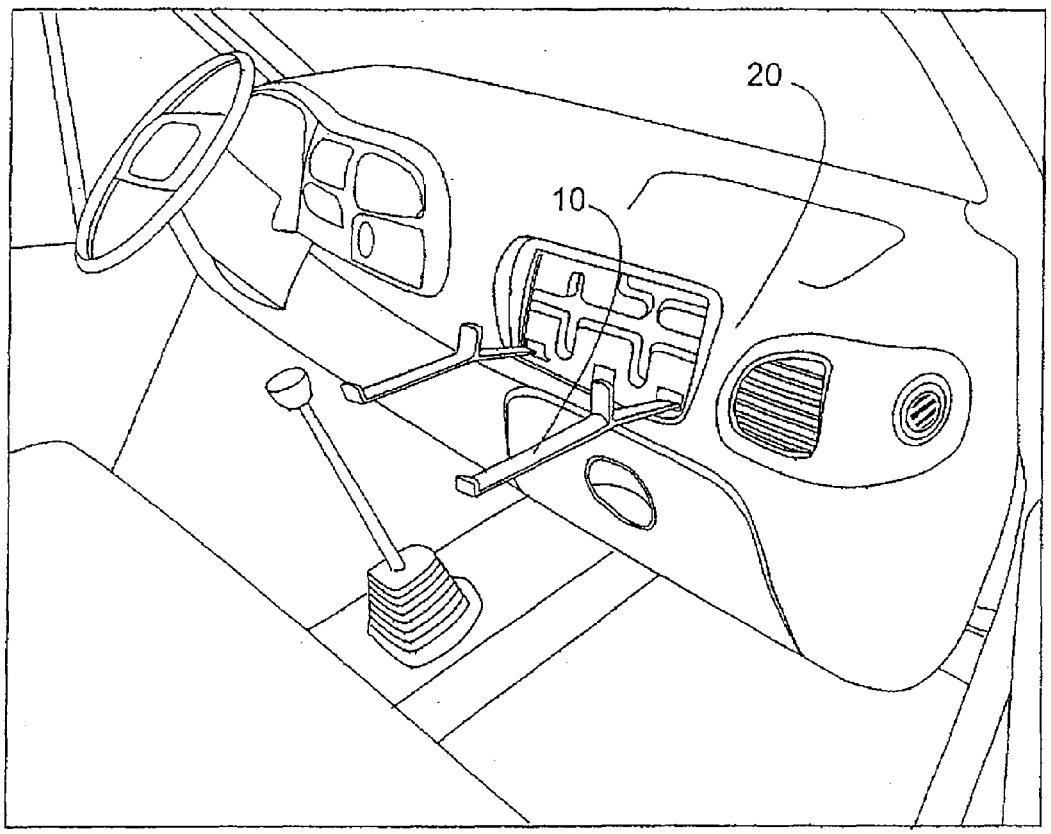
Figure 6:
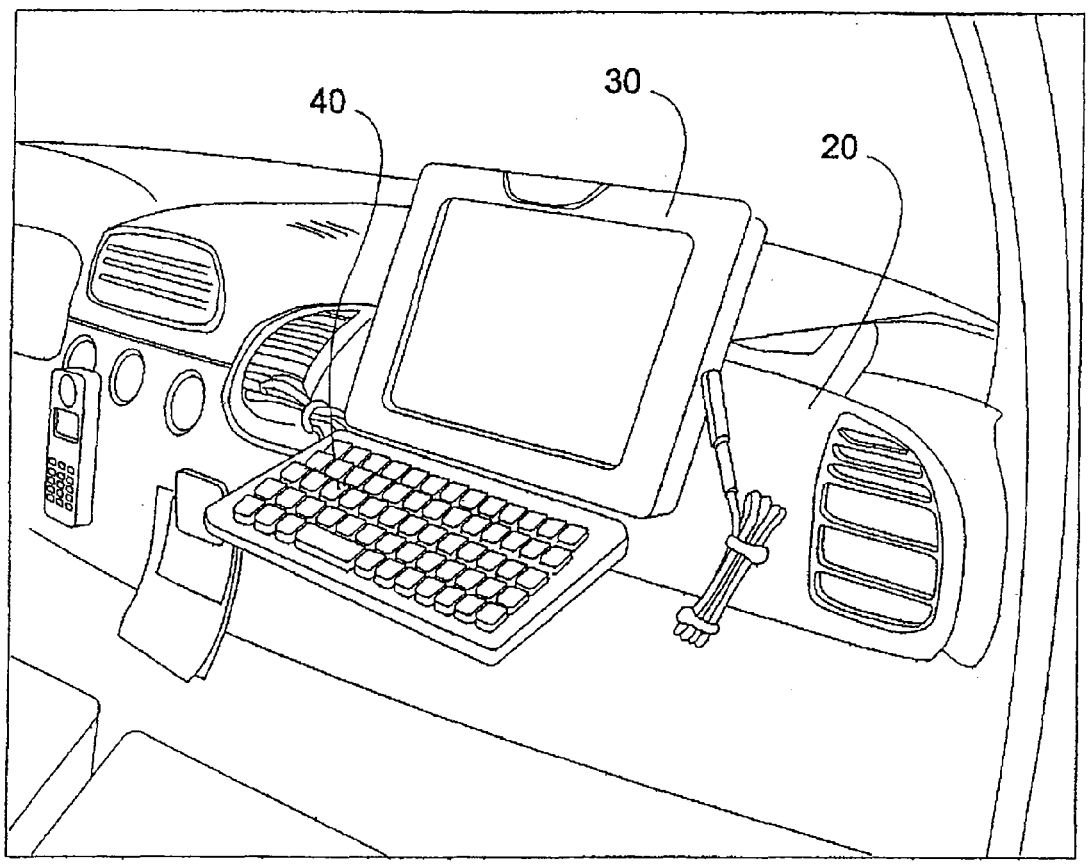
Figure 7:
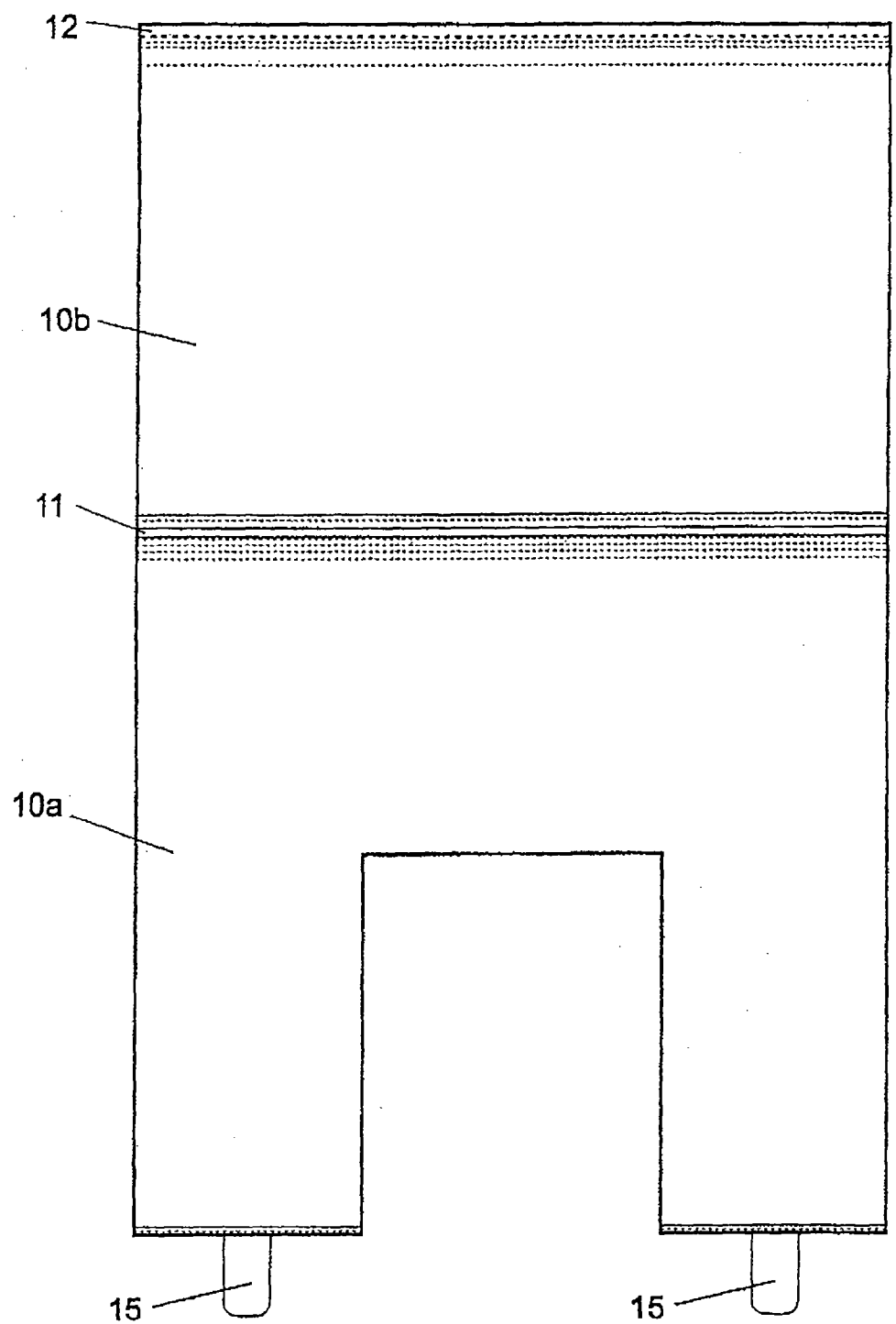
Figure 8:
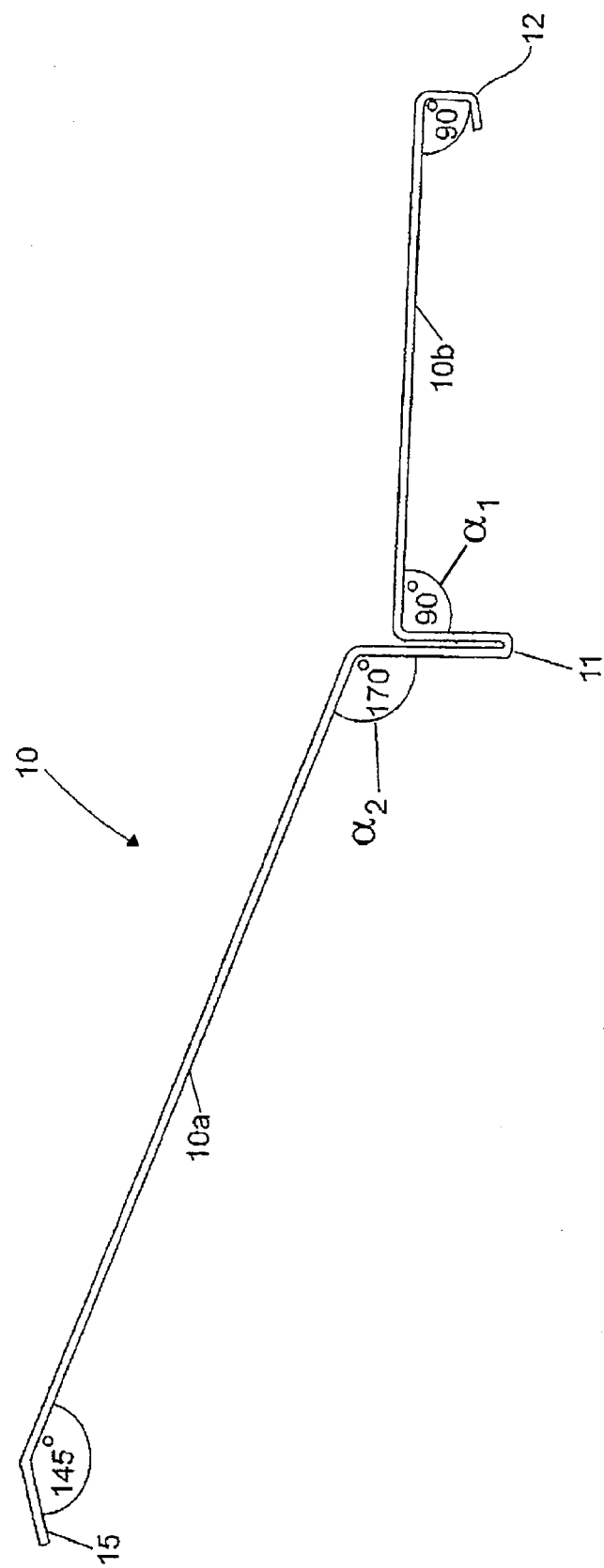
Figure 13:
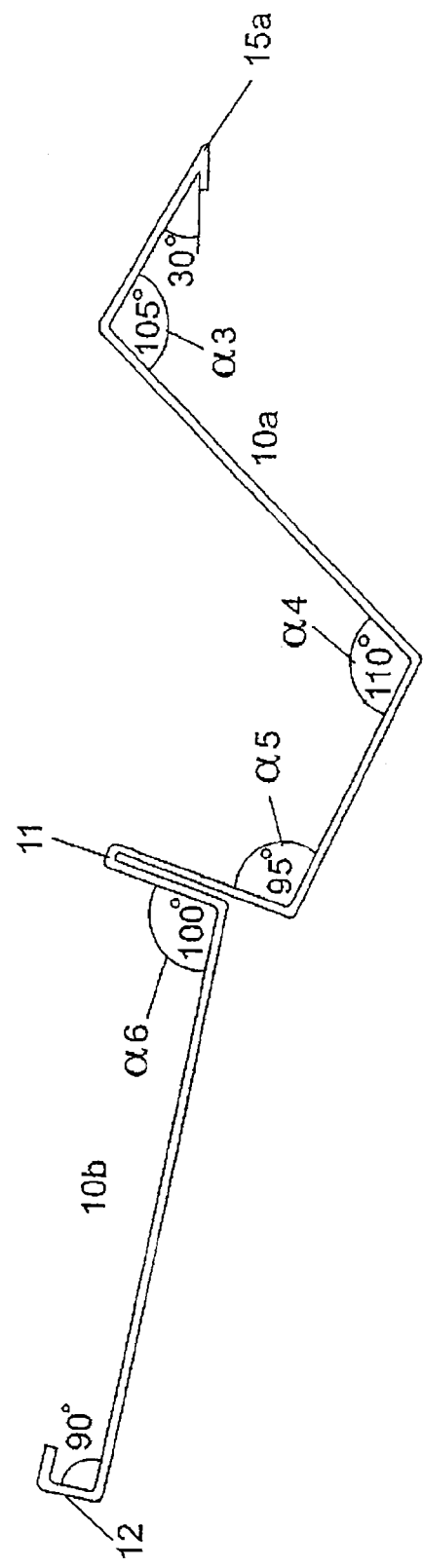
Figure 14:
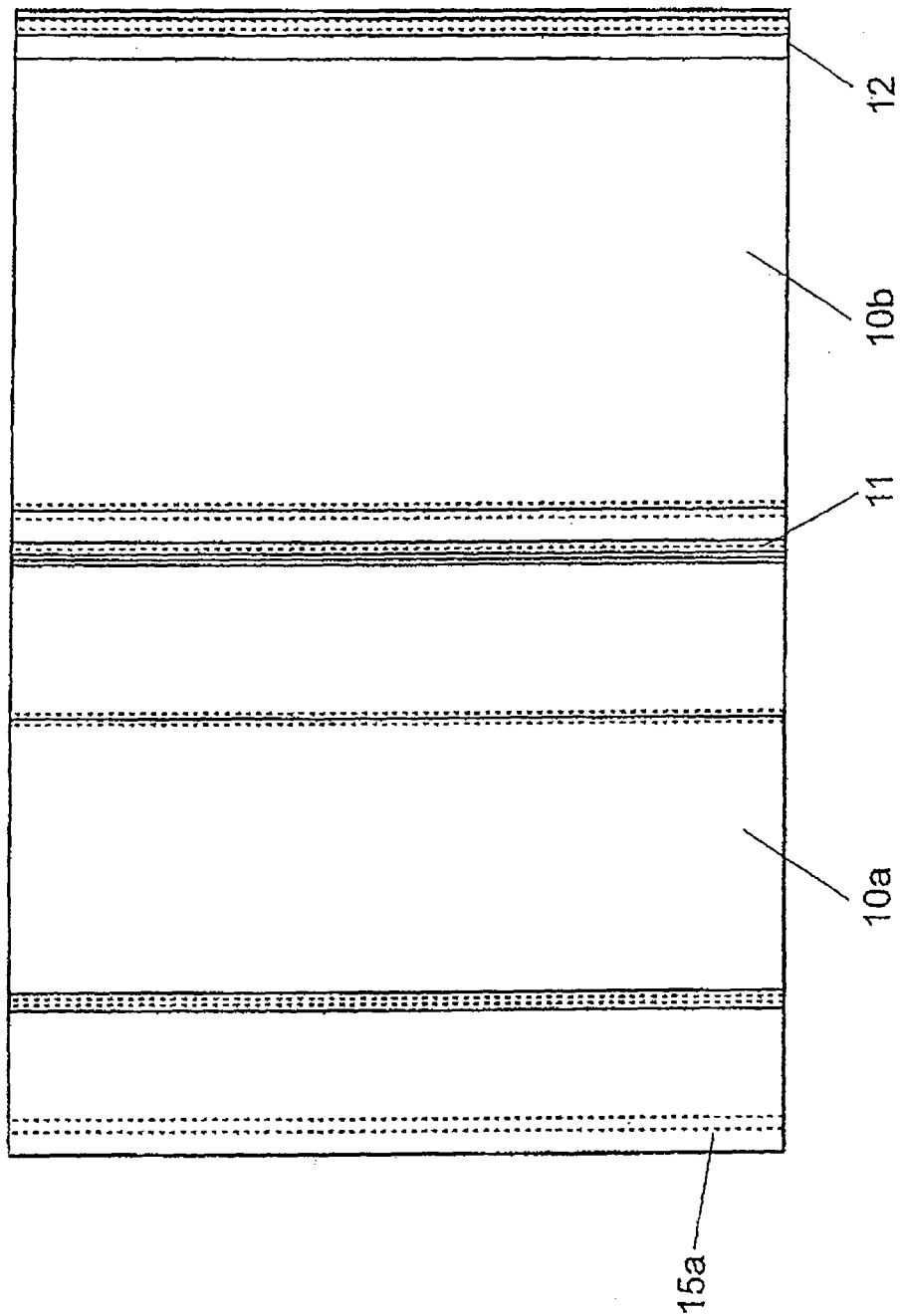

FIGS. 3 to 5 each show views of two holders as shown in FIGS. 1 and 2, which are fixed in a dashboard, FIG. 6 shows a mobile unit on two holders which are fixed in a dashboard, FIG. 7 shows a plan view of a holder in accordance with a second embodiment, FIG. 8 shows a side view of the holder of FIG. 7, FIGS. 9 to 12 each show a respective holder as illustrated in FIGS. 7 and 8 which are fixed in a dashboard, FIG. 13 shows a side view of a holder in accordance with a third embodiment, FIG. 14 shows a plan view of a holder of FIG. 13, and FIGS. 15 to 20 each show respective holders as shown in FIG. 13 or FIG. 14 which are fixed in a dashboard.

DETAILED DESCRIPTION OF THE INVENTION

FIG. 1 shows a side view of a bar for holding a mobile terminal and/or a screen in accordance with a first embodiment. The bar has a first end and a second end 10a, 10b and a first side and a second side, wherein the first side in operation faces upwardly and the second side faces downwardly. Provided between the first and second ends 10a, 10b is an angle α. The angle α is preferably 170°. An edge 12 is provided at the second end 10b of the bar. An angle β is provided between the edge 12 and the second end 10. The angle β is preferably 100°. A nose 11 is provided on the first side of the bar, at the point at which the first and second ends 10a, 10b meet.

FIG. 2 shows a plan view of the bar of FIG. 1. A reduction in the bar width is shown at the first end 10a of the bar 10. The nose 15 which results therefrom serves in particular for being inserted into openings in a dashboard.

FIGS. 3, 4 and 5 each show two bars 10 which are introduced into holes in a dashboard 20 on the passenger side of a vehicle. In particular the first ends 10a of the bars or the nose 15 at the first ends of the bar were inserted into holes in the dashboard 20 so the bars 10 are on the dashboard and the computer can be supported on the dashboard.

Herein, the terms "on" or "onto" are used in the sense of mounting one object to another, such as on a dashboard, and includes attachment with brackets, mounting brackets in holes, mounting brackets with or without fasteners and is not limited solely to being on top of a dashboard.

FIG. 6 shows a dashboard 20 with two inserted bars 10. A keyboard 40 is mounted at the second end of the bars and a screen 30 stands upright with its rear side to the dashboard 20 of the vehicle, wherein the lower side of the screen 30 is clamped between the dashboard 20 and the noses 11. An ergonomic arrangement of the keyboard is afforded by the slight inclination of the second end 10b of the bars 10.

When the maintenance operations have been concluded the keyboard 40 and the screen 30 can be removed and suitably stowed. The bars 10 can also be readily pulled out and appropriately stowed.

FIG. 7 shows a plan view and FIG. 8 shows a side view of a holder in accordance with the second embodiment. In contrast to the holder in accordance with the first embodiment which is formed from two bars, the holder in accordance with the second embodiment is in the form of a single part. The holder in FIG. 7 has a first portion 10a for fixing in a dashboard of a vehicle and a second portion for accommodating mobile units. Provided at the first portion or first end 10a of the holder are two noses 15 which can be inserted into openings in a dashboard or a console on the passenger side. A recess is preferably provided in the first portion 10a. An edge 12 is provided on the second portion 10b of the holder. As in the case of the bar in accordance with the first embodiment, a nose 11 is also provided between the first and second portions 10a, 10b. The first and second portions 10a, 10b, the nose 11 and the edge 12 are bent in one piece from a piece of sheet. Angles α1 and α2 can be provided between the nose 11 and the first and second portions. Variations in those angles make it possible to adapt the holder to the mobile unit or data processing apparatus to be accommodated. The angle α1 is preferably 90° and the angle α2 is preferably 110°. An angle between the nose 15 and the first portion 10a is preferably 145°.

Figure 9:
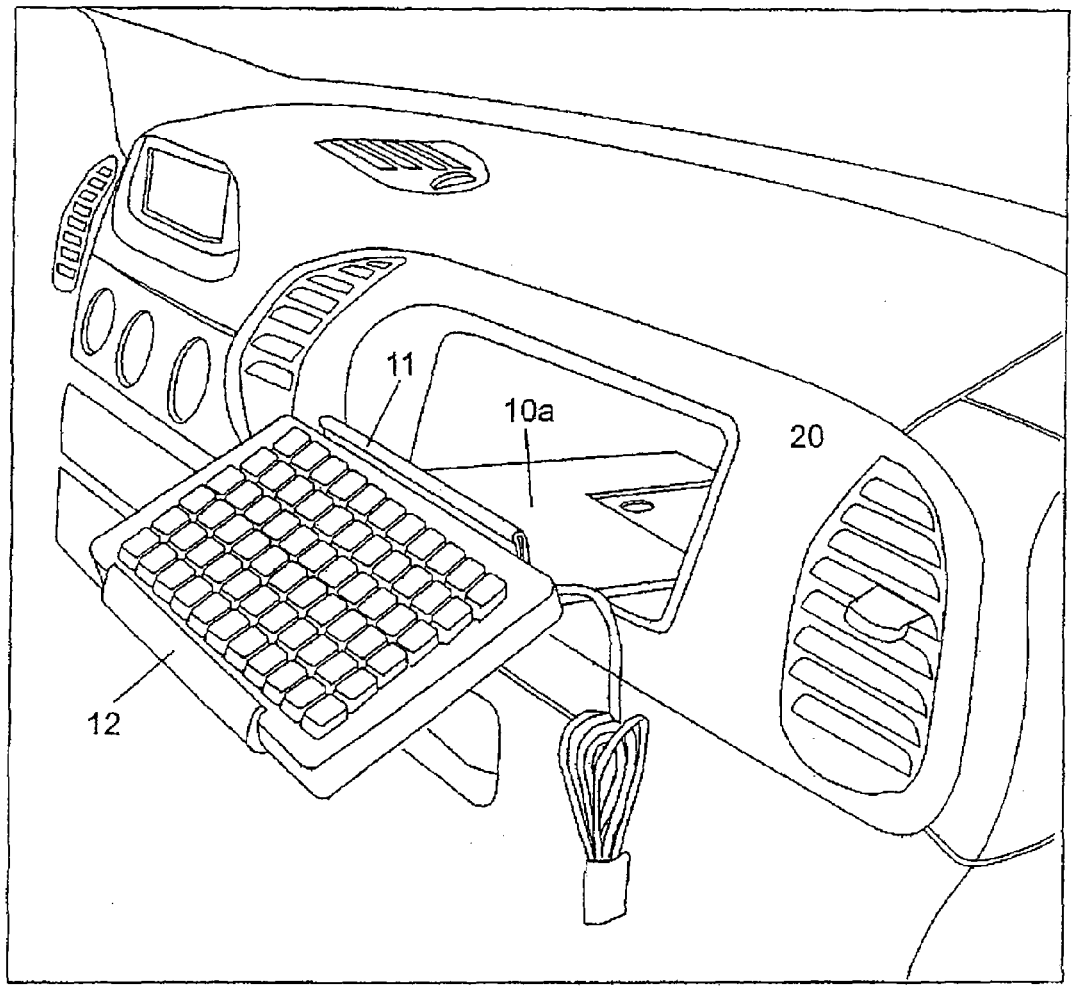
Figure 10:
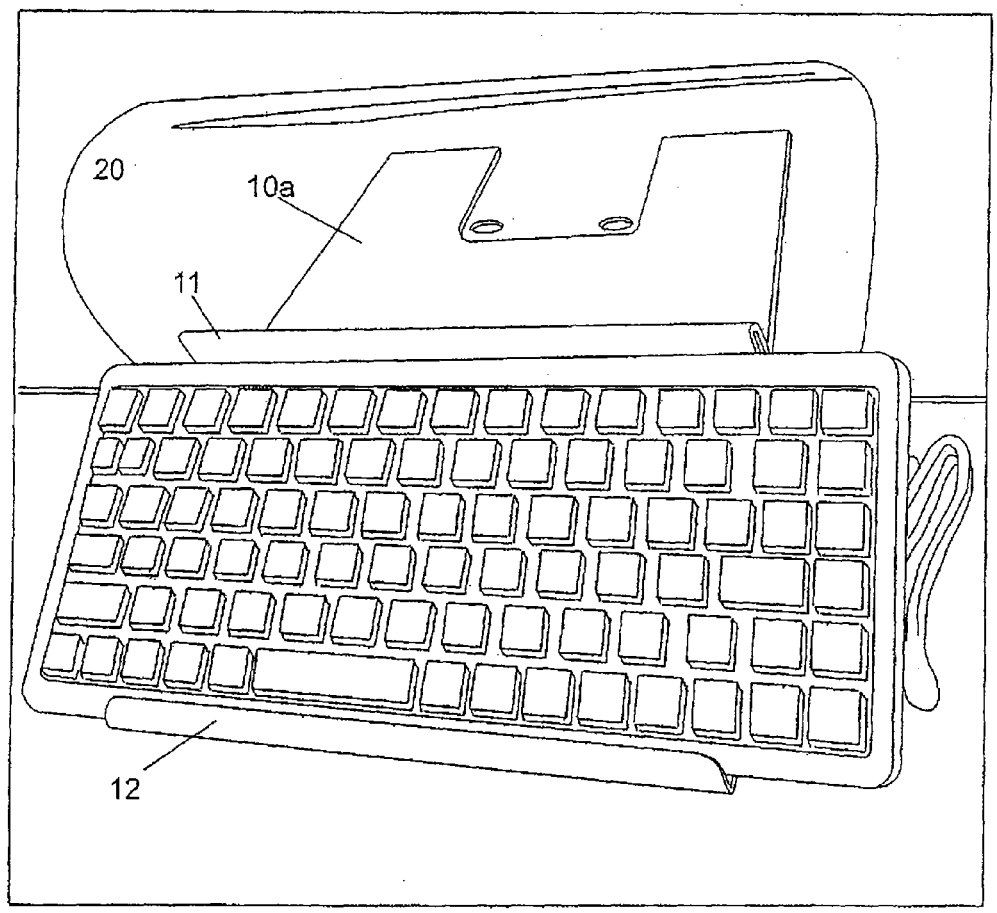
Figure 11:
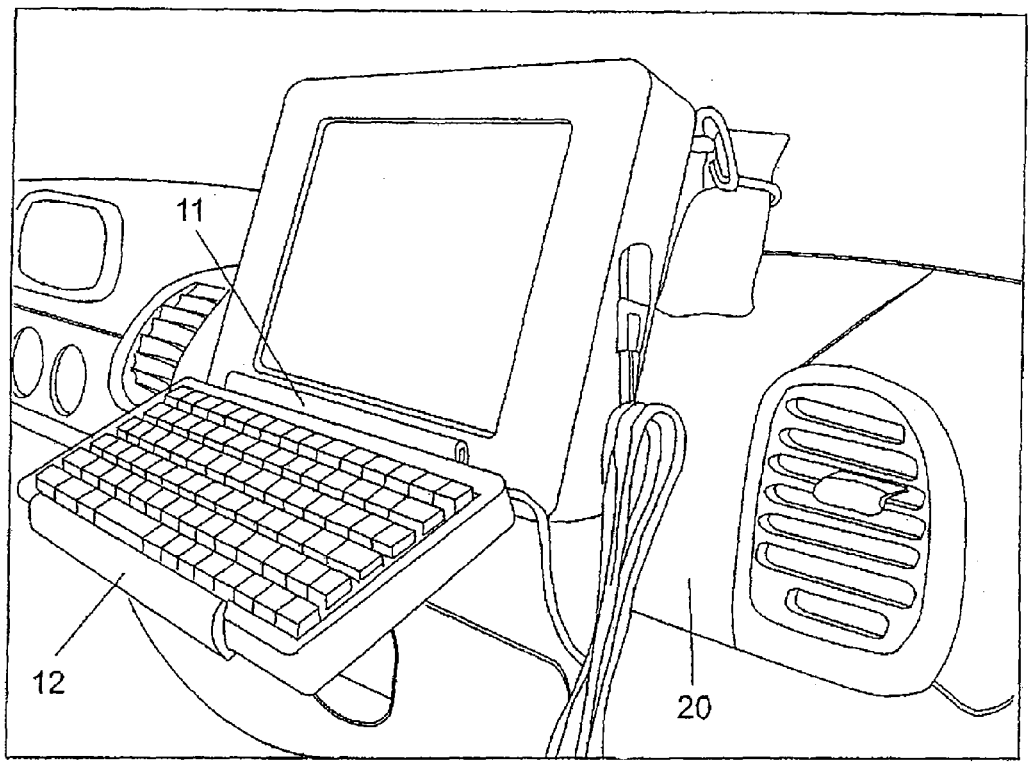
Figure 12:
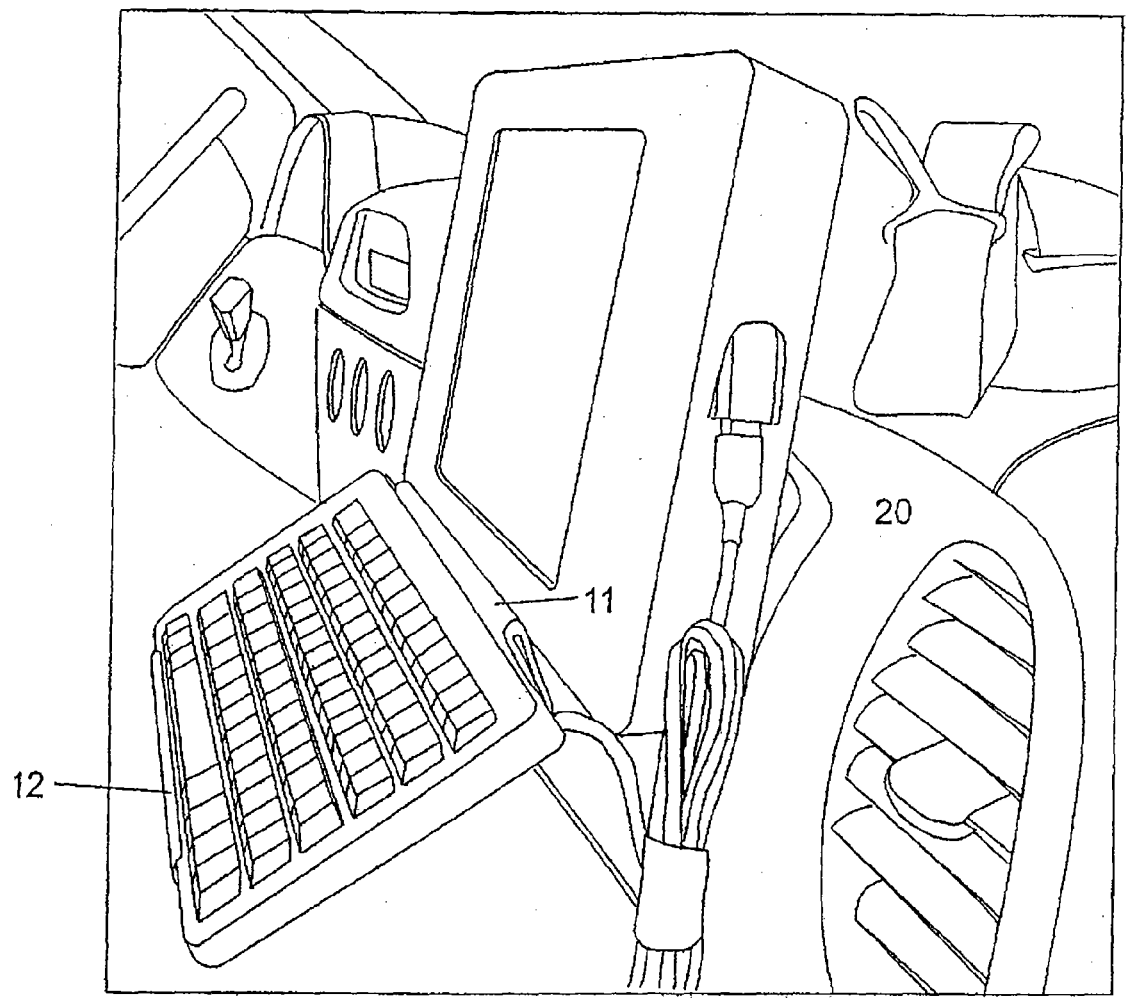

FIGS. 9 to 12 each show a holder which is mounted on the dashboard by being in holes in a dashboard 20 on the passenger side of a vehicle. In this case in particular the first portion 10a of the holder or the noses 15 are inserted into holes on the dashboard 20 so the holder 10 is on the dashboard 20. In this case the arrangement of the holder and of the noses 15 is such that existing holes in the dashboard can be used. FIGS. 9 and 10 show the inserted holder and a keyboard on the second portion 10b. As can be seen from those two Figures the keyboard can be mounted between the hook 12 and the nose 11. In addition to the holders with a keyboard as shown in FIGS. 9 and 10, FIGS. 11 and 12 show the corresponding holders and a screen which is set up or clamped between the nose 11 and the dashboard 20.

FIGS. 13 and 14 show a side view and a plan view of a holder in accordance with a third embodiment. While the bar in accordance with the first embodiment and the holder in accordance with the second embodiment each have a respective nose 15 on the first portion 10a, the holder in accordance with the third embodiment has a hook 15a. In addition—as in the first and second embodiments—a hook 12 is provided on a second portion 10b of the holder. The holder also has a first portion and a second portion 10a, 10b. A nose is provided between the first and second portions 10a, 10b, as in the case of the holder in accordance with the second embodiment. In contrast to the holder of the second embodiment the first portion 10a has a further kink or bend whereby the holder can be better hookingly engaged on or in the dashboard of a vehicle.

Figure 15:
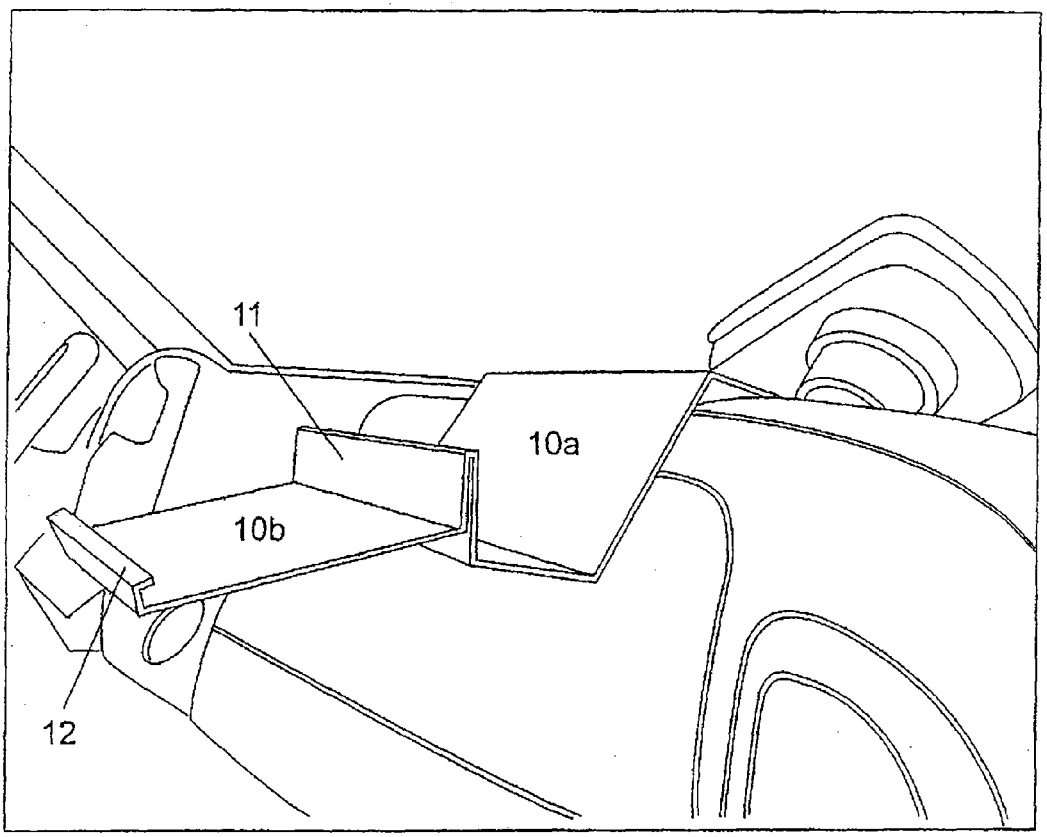
Figure 16:
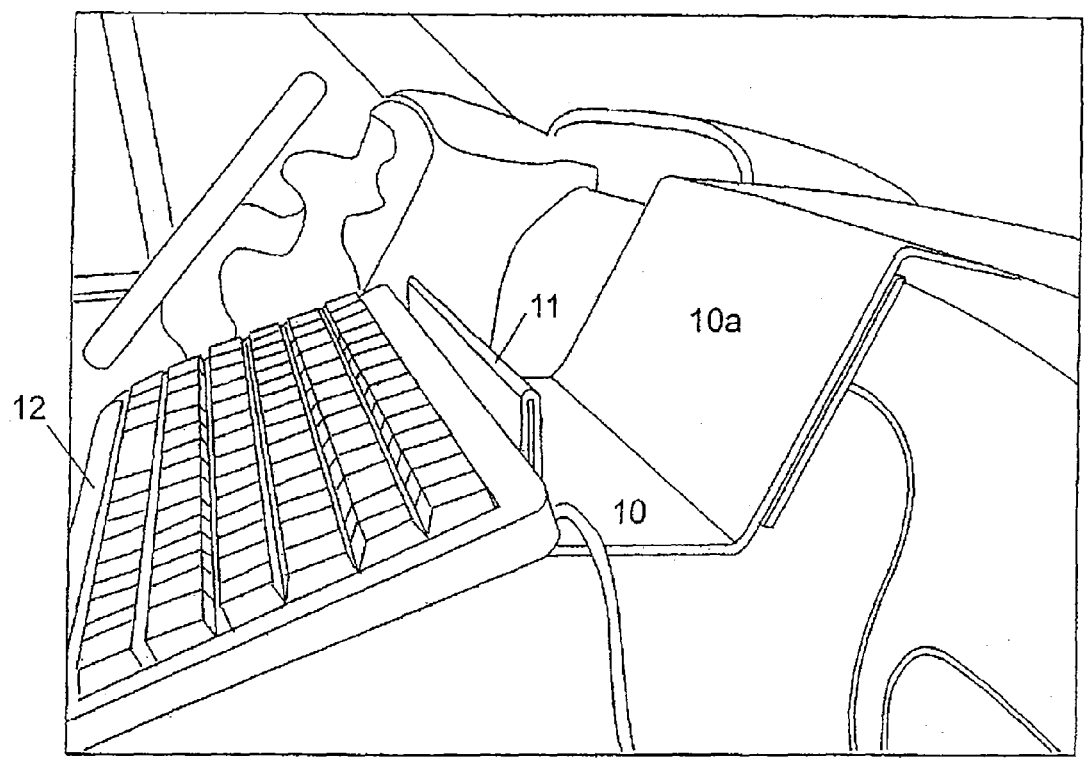
Figure 17:
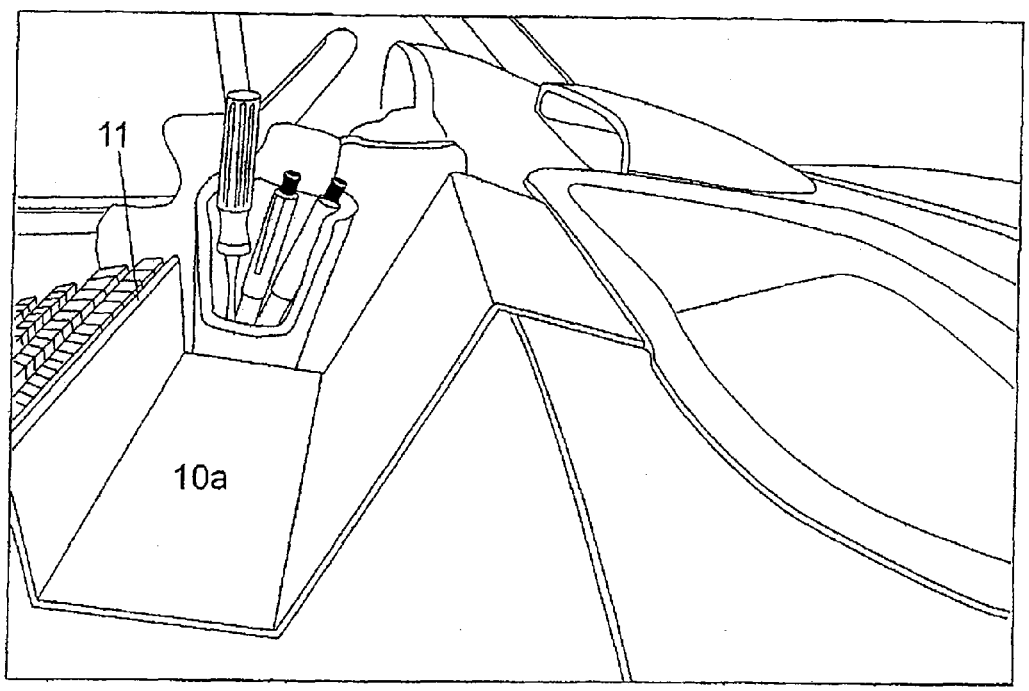
Figure 18:
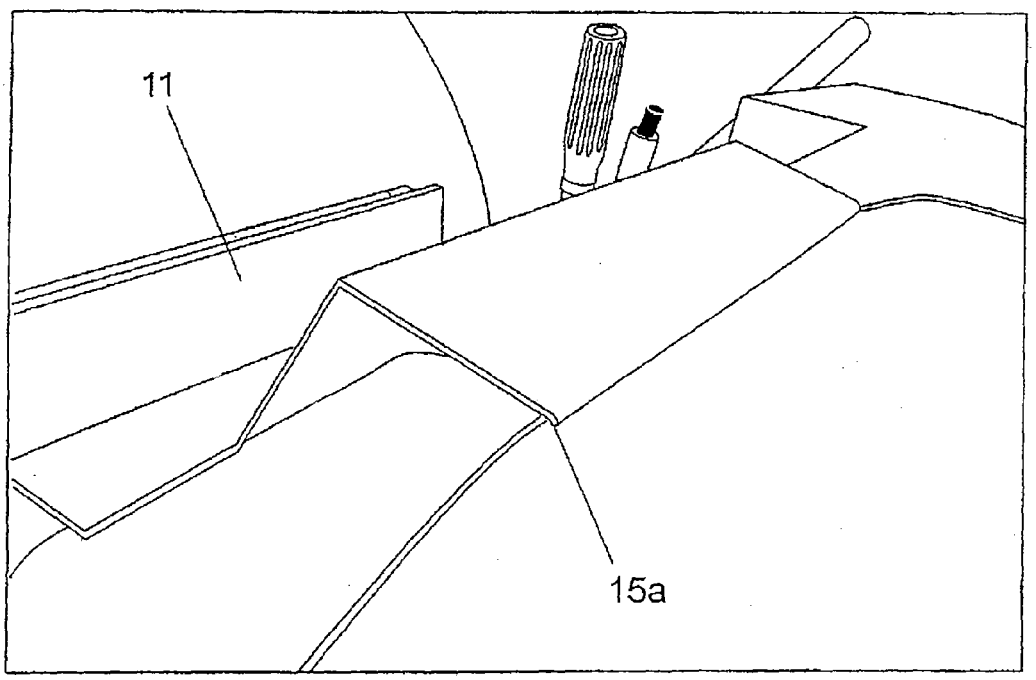
Figure 19:
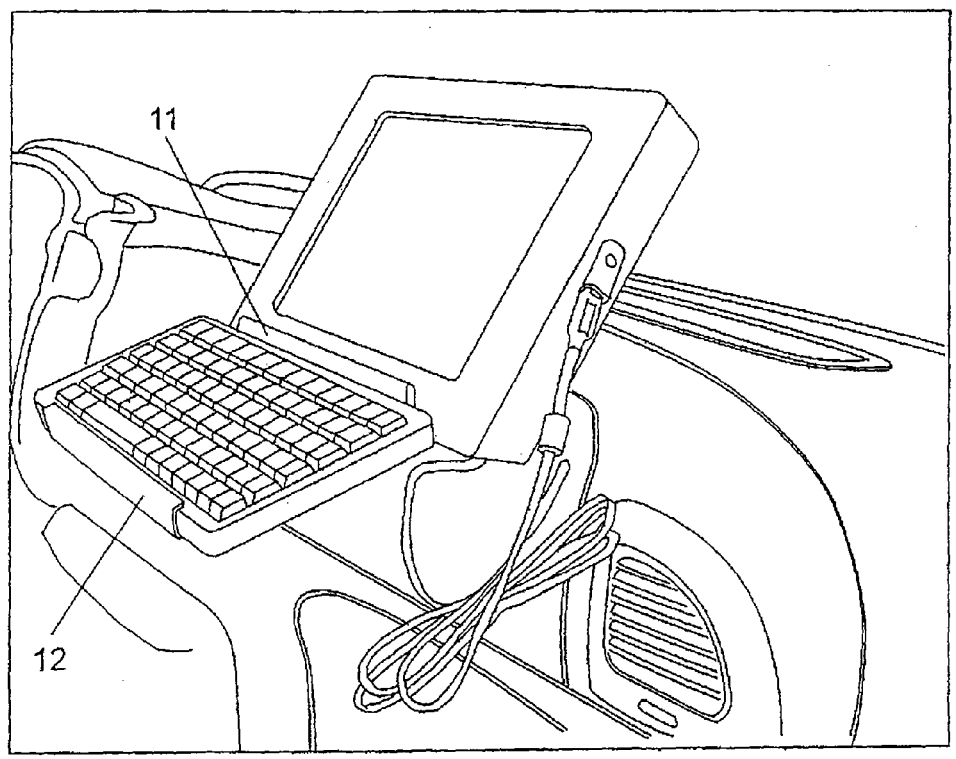
Figure 20:
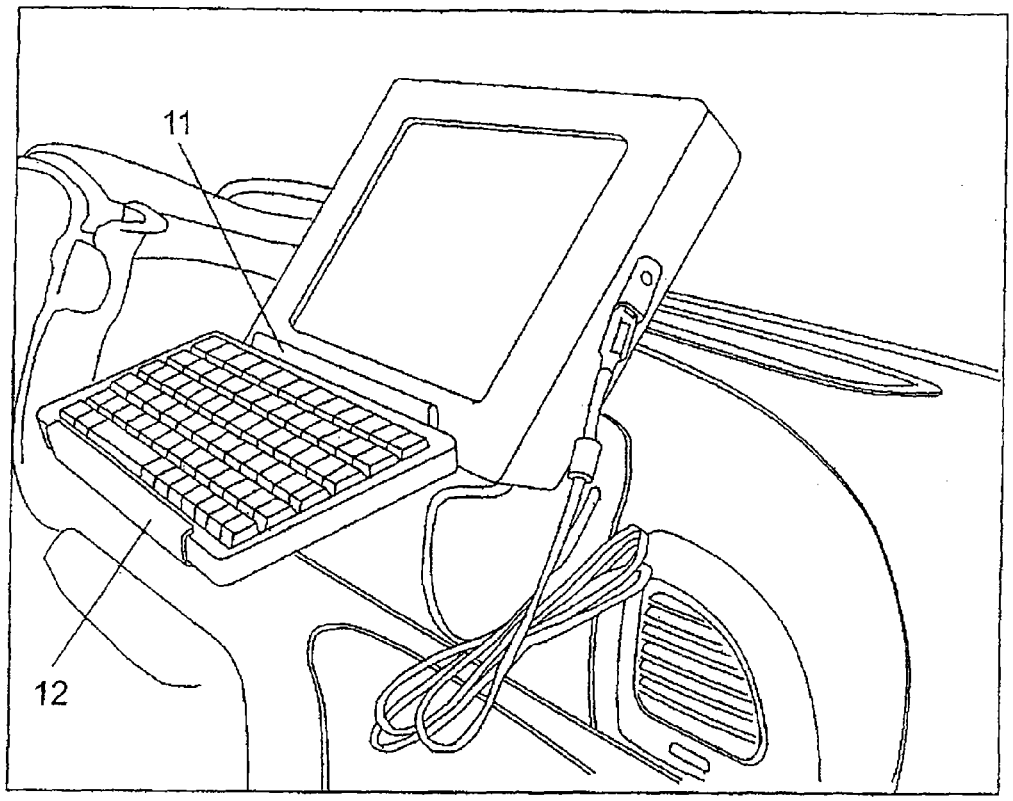

FIG. 15 shows the holder 10 which is mounted or hookingly engaged on a dashboard 20 on the passenger side of a vehicle. FIG. 16 additionally shows a keyboard which is mounted between the hook 12 and the nose 11. FIGS. 17 and 18 show further details as to the way in which the holder 10 is fixed or hookingly engaged by the hook 15a on or onto the dashboard of a vehicle. FIGS. 19 and 20 show the holder which is fixed to the dashboard 20 of a vehicle, with a keyboard and a screen.

That therefore provides a simple and inexpensive possible way of mounting mobile terminals/screens for example for maintenance operations in the interior of a service vehicle and correspondingly quickly and easily removing them after the maintenance operations are concluded.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A portable removable holding device for accommodating a mobile computer unit in the passenger region of a vehicle, comprising:
at least one holder having a first portion and a second portion, the first portion including a nose member configured for removable insertion onto a dashboard of a vehicle and a first support surface for receiving and supporting a first part of the mobile computer unit, and the second portion including a second support surface for receiving and supporting a second part of the mobile computer unit and an upstanding edge member extending at an angle with respect to the second support surface for retaining the second part of the mobile computer unit on the second support surface when the at least one holder is inserted onto the dashboard with the second support surface in an inclined position.

2. The holding device according to claim 1 wherein the nose member of the first portion of the at least one holder is suitable for being inserted into existing openings in the dashboard of the vehicle.

3. The holding device according to claim 1 wherein a upstanding nose member is provided on a first side of the at least one holder at a position where the first portion and the second portion converge, and wherein the nose member is in a spaced relationship with the upstanding edge member to receive the second part of the mobile computer unit therebetween.

4. The holding device according to claim 1 wherein an angle of less than 180° is included between a second side of each of the first portion and the second portion proximate where the first portion meets the second portion.

5. A portable holding device for a mobile computer unit, comprising:
a holder having a first portion and a second portion, the first portion configured to removably attach onto a dashboard of a vehicle and support a first part of the mobile computer unit, and the second portion adapted to receive and support a second part of the mobile computer unit between a distal end of the holder and a nose projecting outwardly from the holder proximate where the first portion and the second portion converge, and wherein an upstanding edge is provided at the distal end of the holder in a spaced relationship with the nose to receive the second part of the mobile computer unit therebetween.

6. The holding device according to claim 5 wherein the first portion is configured to removably attach onto the dashboard via existing openings therein.

7. The holding device according to claim 5 wherein an angle of less than 180° is included between a second side of each of the first portion and the second portion to incline the second portion when the first portion is attached onto the dashboard.

8. The holding device according to claim 5 wherein the holder is one piece.

9. The holding device according to claim 8 wherein the holder is one piece formed from a piece of sheet.

10. The holding device according to claim 5, further comprising:
a substantially identical second holder.

11. A portable removable holding device for accommodating a mobile computer unit in the passenger region of a vehicle, comprising:
at least one holder having a first portion and a second portion, the first portion configured to removably attach onto a dashboard of a vehicle and support a computer screen of the mobile computer unit, and the second portion including a substantially flat support surface to support a keyboard of the mobile computer, the support surface located between an upstanding edge that projects upwardly at an angle with respect to the support surface and a nose projecting outwardly from the holder proximate where the first portion and the second portion converge.

* * * * *